US012134979B2

(12) United States Patent
Sugihara

(10) Patent No.: US 12,134,979 B2
(45) Date of Patent: Nov. 5, 2024

(54) V-TYPE ENGINE INCLUDING CATALYST EXTENDING IN HEIGHT DIRECTION OF ENGINE BODY AND WORK MACHINE INCLUDING SAME

(71) Applicant: HONDA MOTOR CO., LTD., Tokyo (JP)

(72) Inventor: Atsuki Sugihara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/549,527

(22) PCT Filed: Mar. 10, 2021

(86) PCT No.: PCT/JP2021/009504
§ 371 (c)(1),
(2) Date: Sep. 7, 2023

(87) PCT Pub. No.: WO2022/190251
PCT Pub. Date: Sep. 15, 2022

(65) Prior Publication Data
US 2024/0159177 A1 May 16, 2024

(51) Int. Cl.
*F01N 3/28* (2006.01)
*F02B 75/22* (2006.01)

(52) U.S. Cl.
CPC ............ *F01N 3/2885* (2013.01); *F02B 75/22* (2013.01); *F01N 2340/04* (2013.01)

(58) Field of Classification Search
CPC ........................... F01N 3/2885; F01N 2340/04
USPC ........................................................... 60/302
See application file for complete search history.

(56) References Cited

U.S. PATENT DOCUMENTS 3,884,658 A * 5/1975 Roach .................... F02M 35/08 55/482
4,482,365 A * 11/1984 Roach .................... B01D 46/26 55/303
5,014,816 A * 5/1991 Dear ................ F02M 35/10013 181/229
5,346,417 A * 9/1994 Isogawa .................... F01N 3/28 440/89 R
(Continued)

FOREIGN PATENT DOCUMENTS

JP H0510772 U 2/1993
JP H05246389 A 9/1993
(Continued)

OTHER PUBLICATIONS

Written Opinion of the International Searching Authority for Japanese Patent Application PCT/JP2021/009504 mailed May 11, 2021; 8 pp.

*Primary Examiner* — J. Todd Newton
(74) *Attorney, Agent, or Firm* — Armstrong Teasdale LLP

(57) ABSTRACT

A V-type engine includes an engine body including a crankcase configured to rotatably support a crankshaft, and a first and second cylinder banks extending from the crankcase, an exhaust collecting pipe connected to the first and second cylinder banks, a catalyst accommodated in the exhaust collecting pipe, and a muffler detachably connected to the exhaust collecting pipe, wherein the catalyst extends in a height direction of the engine body from a base end side of the first cylinder bank to a distal end side of the first cylinder bank.

8 Claims, 4 Drawing Sheets

(56) References Cited

U.S. PATENT DOCUMENTS

| | | | | |
|---|---|---|---|---|
| 7,484,361 | B2 * | 2/2009 | Yamaguchi | F01N 13/009 60/299 |
| 2003/0162451 | A1 * | 8/2003 | Ozawa | F01N 3/043 60/299 |
| 2005/0217635 | A1 * | 10/2005 | Vogel | F02M 35/1255 123/198 E |

FOREIGN PATENT DOCUMENTS

| | | | |
|---|---|---|---|
| JP | 2006226187 | A | 8/2006 |
| JP | 2008247359 | A | 10/2008 |

* cited by examiner

V-TYPE ENGINE INCLUDING CATALYST EXTENDING IN HEIGHT DIRECTION OF ENGINE BODY AND WORK MACHINE INCLUDING SAME

CROSS-REFERENCE TO RELATED APPLICATION

This application is a U.S. national stage application of PCT/JP2021/009504, filed on Mar. 10, 2021, which is hereby expressly incorporated by reference in its entirety.

TECHNICAL FIELD

The present invention relates to a V-type engine and a work machine.

BACKGROUND ART

Conventionally, an engine is provided with an exhaust device for discharging an exhaust gas generated in a combustion process. The exhaust device includes an exhaust pipe through which the exhaust gas passes, a catalyst configured to purify the exhaust gas, a muffler configured to reduce an exhaust sound, and the like. For example, the exhaust gas generated in the combustion process passes through the exhaust pipe, the catalyst, and the muffler in this order, and is discharged outside the engine.

For example, Patent Document 1 discloses an exhaust purifying device for a V-type engine. The exhaust purifying device includes a front exhaust passage connected to a front bank, a rear exhaust passage connected to a rear bank, a primary exhaust passage connected to the front exhaust passage and the rear exhaust passage, a catalytic converter provided in the primary exhaust passage, and a catalyst provided in the catalytic converter.

PRIOR ART DOCUMENT(S)

Patent Document(s)

Patent Document 1: JP2006-226187A

SUMMARY OF THE INVENTION

Task to be Accomplished by the Invention

However, in Patent Document 1, the catalytic converter is away from the front bank and the rear bank. Accordingly, the V-type engine including the exhaust purifying device becomes larger. Further, in Patent Document 1, the catalyst is installed only in an upstream portion of the catalytic converter, so the length of the catalyst is short. Accordingly, it is difficult to improve the performance to purify the exhaust gas. Furthermore, in the exhaust purifying device as described above, a muffler may be fixed to the primary exhaust passage by welding or the like. However, adopting such a configuration reduces the flexibility for setting the muffler.

In view of the above background, an object of the present invention is to improve the flexibility for setting a muffler and sufficiently secure the length of a catalyst while making a V-type engine compact.

Means to Accomplish the Task

To achieve such an object, one aspect of the present invention provides a V-type engine (1), comprising: an engine body (3) including a crankcase (7) configured to rotatably support a crankshaft (11), and a first and second cylinder banks (8, 9) extending from the crankcase; an exhaust collecting pipe (31) connected to the first and second cylinder banks; a catalyst (32) accommodated in the exhaust collecting pipe; and a muffler (33) detachably connected to the exhaust collecting pipe, wherein the catalyst extends in a height direction of the engine body from a base end side of the first cylinder bank to a distal end side of the first cylinder bank.

According to this aspect, the muffler is detachably connected to the exhaust collecting pipe, so that the user can set an appropriate muffler according to the configuration and the like of a work machine in which the V-type engine is installed. Accordingly, the flexibility for setting the muffler can be improved.

Further, the catalyst extends in the height direction of the engine body from the base end side of the first cylinder bank to the distal end side of the first cylinder bank. Accordingly, the engine body and the catalyst are arranged compactly, so that the V-type engine can be made compact. Furthermore, the length of the catalyst can be sufficiently secured, so that the performance to purify an exhaust gas can be improved.

In the above aspect, preferably, the exhaust collecting pipe includes: a first exhaust pipe (41) connected to the first cylinder bank; a second exhaust pipe (42) connected to the second cylinder bank; and a merging pipe (43) connected to a merging portion of the first and second exhaust pipes, and the catalyst is accommodated in the merging pipe.

According to this aspect, the number of catalysts can be reduced as compared with a case where the catalysts are accommodated in each of the first and second exhaust pipes. Accordingly, the configuration of the V-type engine can be simplified.

In the above aspect, preferably, the merging pipe includes: an inlet pipe (51) connected to the merging portion of the first and second exhaust pipes; and an accommodating pipe (52) connected to the inlet pipe on the base end side of the first cylinder bank and extending in the height direction of the engine body from the base end side of the first cylinder bank to the distal end side of the first cylinder bank, the catalyst is accommodated in the accommodating pipe, and the muffler is detachably connected to the accommodating pipe on the distal end side of the first cylinder bank.

According to this aspect, the merging pipe is composed of the inlet pipe and the accommodating pipe. Accordingly, the length of the catalyst can be sufficiently secured while the configuration of the merging pipe is made as simple as possible. Further, the muffler is connected to the accommodating pipe on the distal end side of the first cylinder bank. Accordingly, it is possible to arrange the muffler in either the width direction or height direction of the engine body without protruding the muffler greatly with respect to the engine body. Accordingly, the flexibility of setting of the muffler can be improved.

In the above aspect, preferably, the muffler includes a muffler body (94) having a muffling chamber (111 to 113), and the muffler body extends in a width direction of the engine body from the distal end side of the first cylinder bank to a distal end side of the second cylinder bank.

According to this aspect, the muffler body is arranged perpendicularly to the catalyst. Accordingly, it is possible to sufficiently secure the length of the muffler body without protruding the muffler body greatly with respect to the engine body. Accordingly, the volume of the muffler body is increased, so that the muffling performance can be enhanced.

In the above aspect, preferably, the muffler includes a muffler body having a muffling chamber, and the muffler body extends in the height direction of the engine body from the distal end side of the first cylinder bank to the base end side of the first cylinder bank.

According to this aspect, the muffler body is arranged parallel to the catalyst. Accordingly, it is possible to sufficiently secure the length of the muffler body without protruding the muffler body greatly with respect to the engine body. Accordingly, the volume of the muffler body is increased, so that the muffling performance can be enhanced.

In the above aspect, preferably, the v-type engine further comprises an air cleaner (4) connected to the first and second cylinder banks, wherein the air cleaner has a canister-like shape, and is arranged on an opposite side of the catalyst with the first and second cylinder banks in between when viewed in a width direction of the engine body.

According to this aspect, the air cleaner is arranged sufficiently away from the catalyst. Accordingly, it is possible to prevent the temperature around the air cleaner from rising according to the heat generation of the catalyst. Accordingly, the intake air temperature of the V-type engine can be lowered, so that the output of the V-type engine can be improved.

In the above aspect, preferably, the v-type engine further comprises an air cleaner (4) connected to the first and second cylinder banks, wherein the air cleaner has a flat plate-like shape, and is arranged between the first and second cylinder banks.

According to this aspect, it is possible to arrange the air cleaner by effectively utilizing the space between the first and second cylinder banks. Accordingly, the V-type engine can be made more compact.

In the above aspect, preferably, an output portion (12) of the crankshaft protrudes from a lower surface of the crankcase, and the catalyst is arranged higher than the lower surface of the crankcase.

According to this aspect, in a vertical V-type engine, it is possible to prevent the catalyst from protruding lower than the lower surface of the crankcase. Accordingly, in a case where an engine mount is arranged below the crankcase, the interference between the catalyst and the engine mount can be suppressed.

In the above aspect, preferably, each of the first and second cylinder banks is provided with an exhaust port (19), and the catalyst is arranged more outward than the exhaust port of the first cylinder bank with respect to a width direction of the engine body.

According to this aspect, the interference between a pipe connected to the exhaust port of the first cylinder bank and a pipe accommodating the catalyst can be suppressed.

To achieve such an object, another aspect of the present invention provides a work machine (P) comprising the V-type engine.

According to this aspect, it is possible to improve the flexibility for setting a muffler and sufficiently secure the length of a catalyst while making a work machine compact.

Effect of the Invention

Thus, according to the above aspects, it is possible to improve the flexibility for setting a muffler and sufficiently secure the length of a catalyst while making a V-type engine compact.

BRIEF DESCRIPTION OF THE DRAWING(S)

MODE(S) FOR CARRYING OUT THE INVENTION

V-Type Engine 1

Figure 1:
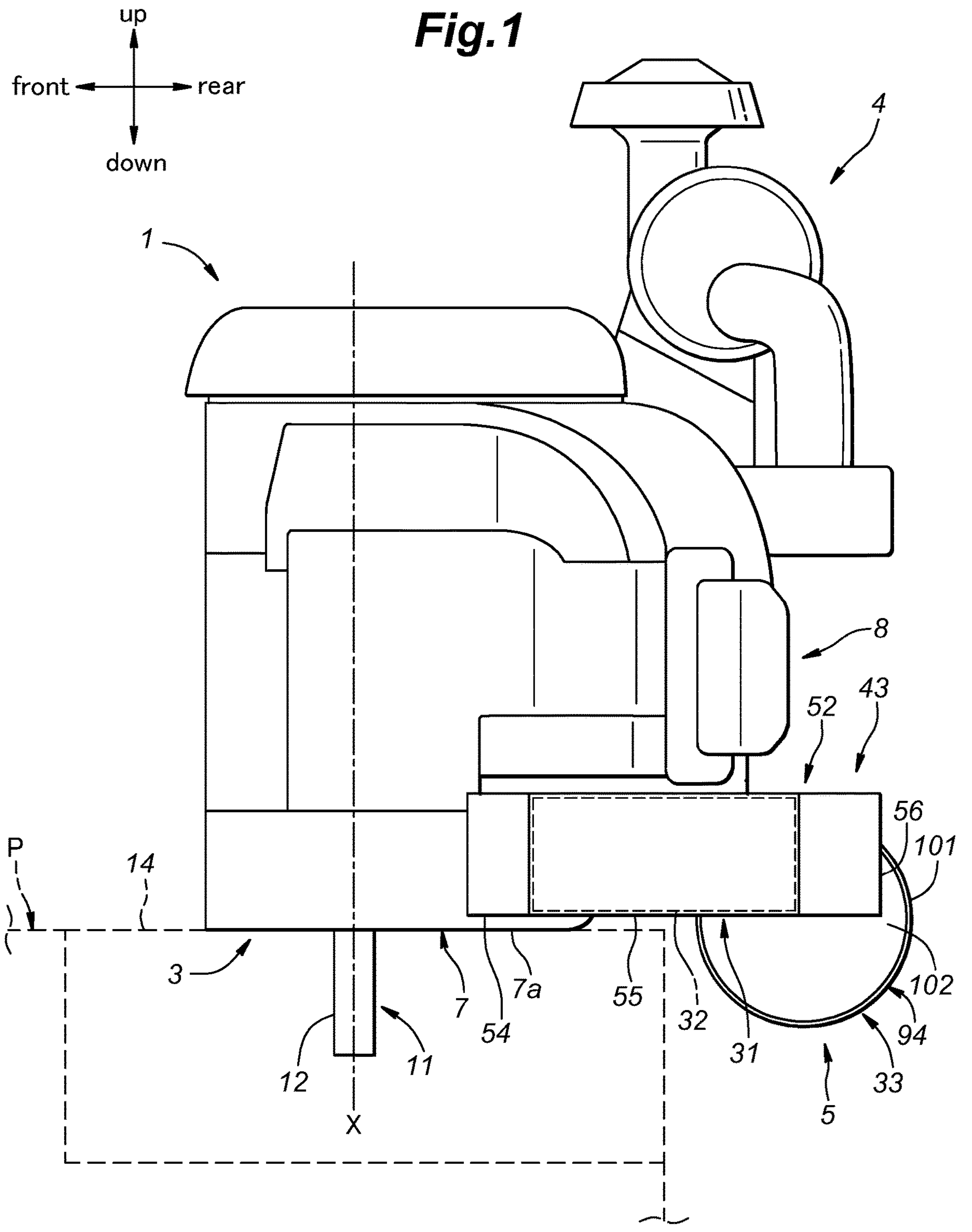
FIG. 1 is a side view showing a V-type engine according to an embodiment of the present invention.

In the following, a V-type engine 1 (hereinafter abbreviated as "engine 1") as an internal combustion engine according to an embodiment of the present invention will be described with reference to FIGS. 1 to 3. Hereinafter, for convenience of explanation, a left side in FIG. 1 is defined as a front side of the engine 1. Further, in this specification, when an expression like "fixed by bolt(s) (not shown)" is used, a member may be fixed by normal bolt(s) having a screw on only one side or by stud bolt(s) having screws on both sides.

With reference to FIG. 1, the engine 1 consists of a general-purpose engine used as a power source of a work machine P. For example, the work machine P consists of a riding-type lawn mower. The engine 1 consists of an OHV air-cooled engine including two cylinders. In another embodiment, the engine 1 may consist of an engine (for example, an OHC engine) other than an OHV engine, an engine (for example, a water-cooled engine) other than an air-cooled engine, or an engine including three or more cylinders.

Figure 2:
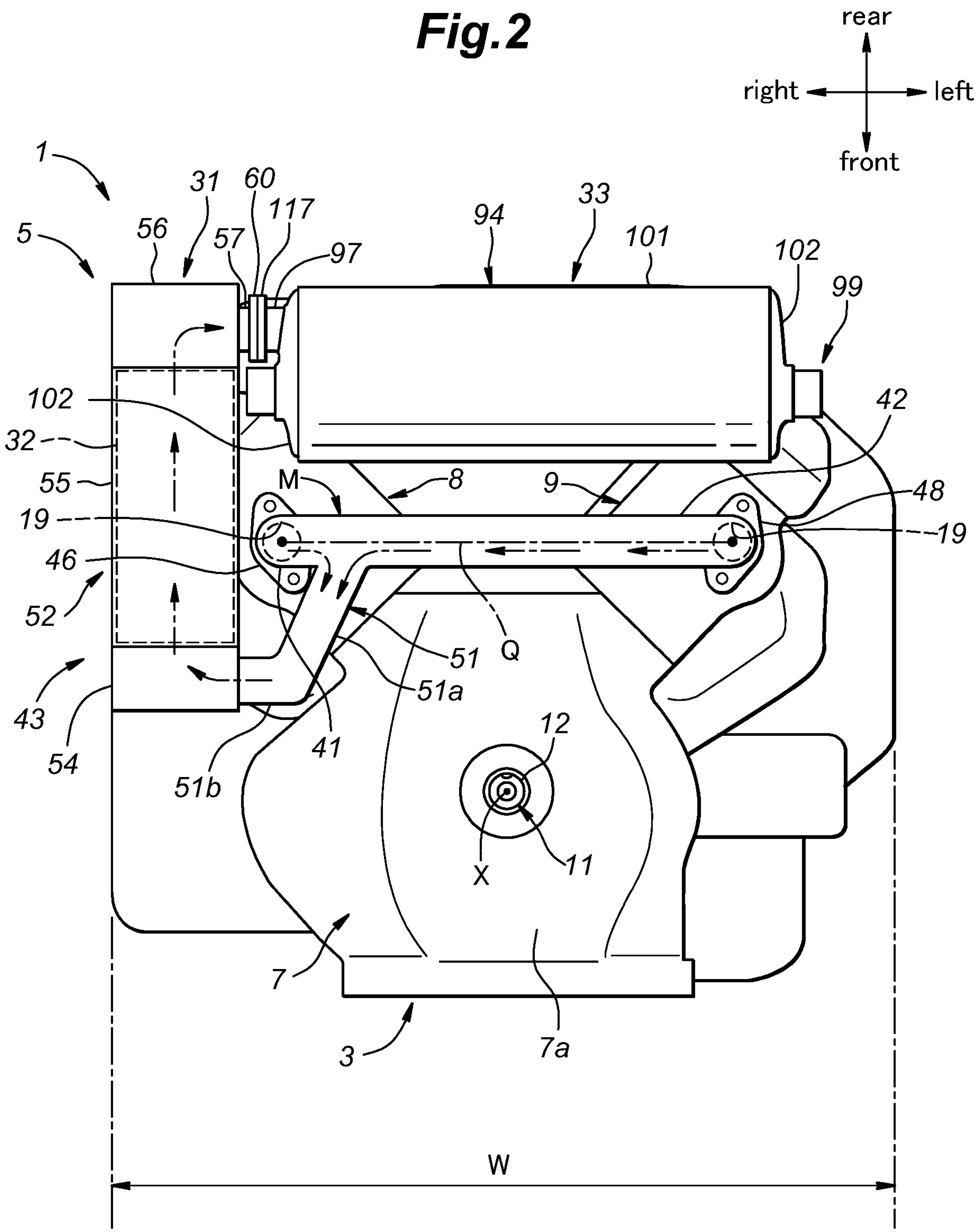
FIG. 2 is a bottom view showing the V-type engine according to the embodiment of the present invention.

With reference to FIGS. 1 and 2, the engine 1 includes an engine body 3, an air cleaner 4 arranged above the engine body 3, and an exhaust device 5 arranged on a lower rear side of the engine body 3. In the following, these components of the engine 1 will be described in order.

<Engine Body 3>

With reference to FIGS. 1 and 2, the engine body 3 includes a crankcase 7, a first cylinder bank 8 extending to a right rear side from the crankcase 7, and a second cylinder bank 9 extending to a left rear side from the crankcase 7.

With reference to FIG. 1, an engine mount 14 is arranged below the crankcase 7. The crankcase 7 is attached to a main body of the work machine P via the engine mount 14.

With reference to FIGS. 1 and 2, a crankshaft 11 is rotatably supported by a central portion of the crankcase 7. The crankshaft 11 is configured to rotate around a rotation axis X extending in the up-and-down direction. That is, the engine 1 consists of a vertical engine in which the rotation axis X of the crankshaft 11 extends in the up-and-down direction. In another embodiment, the engine 1 may consist of a horizontal engine in which the rotation axis X of the crankshaft 11 extends in the horizontal direction. In this case, for example, the work machine P consists of a cutting machine such as a concrete cutter, a floor treatment machine such as a floor leveler, a high-pressure washer, a generator, or the like. A power take-off shaft 12 (PTO shaft: an example of an output portion) is provided at a lower end of the crankshaft 11. The PTO shaft 12 is connected to a work unit of the work machine P (for example, a blade of the riding-type lawn mower), and the work unit of the work machine P is configured to rotate according to the rotation of the PTO shaft 12. The PTO shaft 12 protrudes downward from a lower surface 7*a* of the crankcase 7 and extends in the up-and-down direction.

With reference to FIG. 2, the first and second cylinder banks 8, 9 are aligned in the lateral direction (the width direction of the engine body 3). Each of the first and second cylinder banks 8, 9, is provided diagonally behind the crankcase 7.

In a front portion (cylinder) of each of the first and second cylinder banks 8, 9, a piston (not shown) is accommodated so as to reciprocate. The piston is connected to the crankshaft 11 via a connecting rod (not shown).

A rear portion (cylinder head) of each of the first and second cylinder banks 8, 9 defines a combustion chamber (not shown) together with the piston. On a laterally inner surface of the rear portion of each of the first and second cylinder banks 8, 9, an intake port (not shown) communicating with the combustion chamber opens. On a lower surface of the rear portion of each of the first and second cylinder banks 8, 9, an exhaust port 19 communicating with the combustion chamber opens.

<Air Cleaner 4>

With reference to FIG. 1, the air cleaner 4 has a cylindrical shape (canister-like shape) extending in the lateral direction. The air cleaner 4 is arranged higher than the first and second cylinder banks 8, 9. The air cleaner 4 is connected to the intake ports (not shown) of the first and second cylinder banks 8, 9 via an intake pipe (not shown), and the air cleaned by the air cleaner 4 is introduced into the combustion chamber (not shown) via the intake ports.

<Exhaust Device 5>

The exhaust device 5 is a device configured to discharge the exhaust gas discharged from the engine body 3 to an outside of the engine 1. Hereinafter, an expression "upstream" and an expression "downstream" indicate "upstream" and "downstream" in an exhaust direction (namely, a direction in which the exhaust gas flows inside the exhaust device 5), respectively. One-dot chain line arrows appropriately attached to each figure indicate the exhaust direction. Hereinafter, the description "extends in the front-and-rear direction from the front end side (base end side) of the first cylinder bank 8 to the rear end side (distal end side) of the first cylinder bank 8" means that a component of the exhaust device 5 extends in the front-and-rear direction at least from the front end side (base end side) of the first cylinder bank 8 to the rear end side (distal end side) of the first cylinder bank 8, and does not preclude the above-mentioned component from having a length longer than the above-mentioned layout. The same applies to a description "extends in the lateral direction from the rear end side (distal end side) of the first cylinder bank 8 to the rear end side (distal end side) of the second cylinder bank 9" and a description "extends in the front-and-rear direction from the rear end side (distal end side) of the first cylinder bank 8 to the front end side (base end side) of the first cylinder bank 8".

With reference to FIGS. 1 and 2, the exhaust device 5 includes an exhaust collecting pipe 31, a catalyst 32, and a muffler 33. Hereinafter, the components of the exhaust device 5 will be described in order.

<Exhaust Collecting Pipe 31>

With reference to FIG. 2, the exhaust collecting pipe 31 of the exhaust device 5 is arranged within a width W of the engine body 3 when viewed in the up-and-down direction (the axial direction of the crankshaft 11). The exhaust collecting pipe 31 includes a first exhaust pipe 41, a second exhaust pipe 42, and a merging pipe 43.

The first exhaust pipe 41 of the exhaust collecting pipe 31 extends in the lateral direction. A first fixed flange 46 is provided on an outer circumference of a right end (upstream end) of the first exhaust pipe 41. The first fixed flange 46 is fixed around the exhaust port 19 of the first cylinder bank 8 by a pair of bolts (not shown). Thus, the right end of the first exhaust pipe 41 is connected to the exhaust port 19 of the first cylinder bank 8.

The second exhaust pipe 42 of the exhaust collecting pipe 31 extends in the lateral direction. A second fixed flange 48 is provided on an outer circumference of a left end (upstream end) of the second exhaust pipe 42. The second fixed flange 48 is fixed around the exhaust port 19 of the second cylinder bank 9 by a pair of bolts (not shown). Thus, the left end of the second exhaust pipe 42 is connected to the exhaust port 19 of the second cylinder bank 9. A right end (downstream end) of the second exhaust pipe 42 merges with a left end (downstream end) of the first exhaust pipe 41 at a merging portion M arranged on a lower side of the first cylinder bank 8.

The merging pipe 43 of the exhaust collecting pipe 31 includes an inlet pipe 51, and an accommodating pipe 52.

The inlet pipe 51 of the merging pipe 43 is provided integrally with the first and second exhaust pipes 41, 42. The inlet pipe 51 is composed of an upstream portion 51*a*, and a downstream portion 51*b* arranged on a right front side (downstream side) of the upstream portion 51*a*. The upstream portion 51*a* extends linearly from a left rear side to a right front side. A left rear end (upstream end) of the upstream portion 51*a* is connected to the merging portion M of the first and second exhaust pipes 41, 42 below the first cylinder bank 8. The downstream portion 51*b* is bent rightward from a right front end (downstream end) of the upstream portion 51*a*.

With reference to FIGS. 1 and 2, the accommodating pipe 52 of the merging pipe 43 extends in the front-and-rear direction (the height direction of the engine body 3) from the front end side (base end side) of the first cylinder bank 8 to the rear end side (distal end side) of the first cylinder bank 8. "The height direction of the engine body 3" is, for example, a direction perpendicular to both the width direction of the engine body 3 (the direction in which the first and second cylinder banks 8, 9 are aligned) and the axial direction of the crankshaft 11, and does not necessarily match the up-and-down direction in the actual space. "The height direction of the engine body 3" is, for example, a direction perpendicular to a straight line Q connecting the exhaust ports 19 of the first and second cylinder banks 8, 9. The outer circumferential surface of the accommodating pipe 52 may be fixed to the crankcase 7 and/or the first cylinder bank 8, or may be fixed to the main body of the work machine P.

The accommodating pipe 52 includes an upstream portion 54, a main body portion 55 arranged on a rear side of the upstream portion 54, a downstream portion 56 arranged on a rear side of the main body portion 55, and a connecting portion 57 protruding leftward (inward in the width direction of the engine body 3) from the downstream portion 56. The upstream portion 54 and the main body portion 55, the main body portion 55 and the downstream portion 56, and the downstream portion 56 and the connecting portion 57 are fixed by welding, respectively. The upstream portion 54 is connected to a right end (downstream end) of the downstream portion 51*b* of the inlet pipe 51 on a front end side (base end side) of the first cylinder bank 8. A connecting flange 60 is provided at a left end (downstream end) of the connecting portion 57. In another embodiment, the connecting portion 57 may protrude from the downstream portion 56 in a direction (for example, "downward") other than "leftward". The direction in which the connecting portion 57 protrudes from the downstream portion 56 can be freely set according to the arrangement of the muffler 33 and the like.

<Catalyst 32>

The catalyst 32 of the exhaust device 5 consists of a ternary catalyst, for example. The catalyst 32 is configured to purify the exhaust gas by changing a harmful substance in the exhaust gas, which is discharged from the engine body 3 via the exhaust collecting pipe 31, into a harmless substance by a chemical reaction.

With reference to FIGS. 1 and 2, the catalyst 32 has a cylindrical shape elongated in the front-and-rear direction. That is, in the present embodiment, the longitudinal direction of the catalyst 32 is the front-and-rear direction. The catalyst 32 is accommodated in the accommodating pipe 52 (more specifically, the main body portion 55 of the accommodating pipe 52) of the merging pipe 43 of the exhaust collecting pipe 31. The catalyst 32 is arranged on the boundary between a lower surface and a right surface (side surface) of the first cylinder bank 8, and arranged higher than the lower surface 7*a* of the crankcase 7. When viewed in the lateral direction, the catalyst 32 is arranged on the opposite side of the air cleaner 4 with the first and second cylinder banks 8,9 in between. The catalyst 32 extends in the front-and-rear direction from the front end side (base end side) of the first cylinder bank 8 to the rear end side (distal end side) of the first cylinder bank 8. When viewed in the up-and-down direction, the catalyst 32 is arranged more rightward (outward in the width direction of the engine body 3) than the exhaust port 19 of the first cylinder bank 8. The catalyst 32 is arranged within the width W of the engine body 3 when viewed in the up-and-down direction.

<Muffler 33>

With reference to FIG. 2, the muffler 33 of the exhaust device 5 is arranged on a downstream side of the exhaust collecting pipe 31. The muffler 33 is not welded to the exhaust collecting pipe 31, and is detachably connected to the accommodating pipe 52 of the merging pipe 43 of the exhaust collecting pipe 31 on a rear end side (distal end side) of the first cylinder bank 8. With reference to FIG. 3, the muffler 33 includes a muffler body 94, a plurality of partition walls 95, 96, an inflow pipe 97, a communication pipe 98, and a discharge pipe 99.

With reference to FIGS. 1 and 2, the muffler body 94 is arranged adjacently to the accommodating pipe 52 of the merging pipe 43 on a left side of the accommodating pipe 52 of the merging pipe 43. The muffler body 94 protrudes lower than the lower surface 7*a* of the crankcase 7.

The muffler body 94 is arranged vertically to the catalyst 32, and extends in the lateral direction from the rear end side (distal end side) of the first cylinder bank 8 to the rear end side (distal end side) of the second cylinder bank 9. The left and right side portions of the muffler body 94 overlap with rear portions of the first and second cylinder banks 8, 9 when viewed in the up-and-down direction. The muffler body 94 is arranged within the width W of the engine body 3 when viewed in the up-and-down direction.

Figure 3:
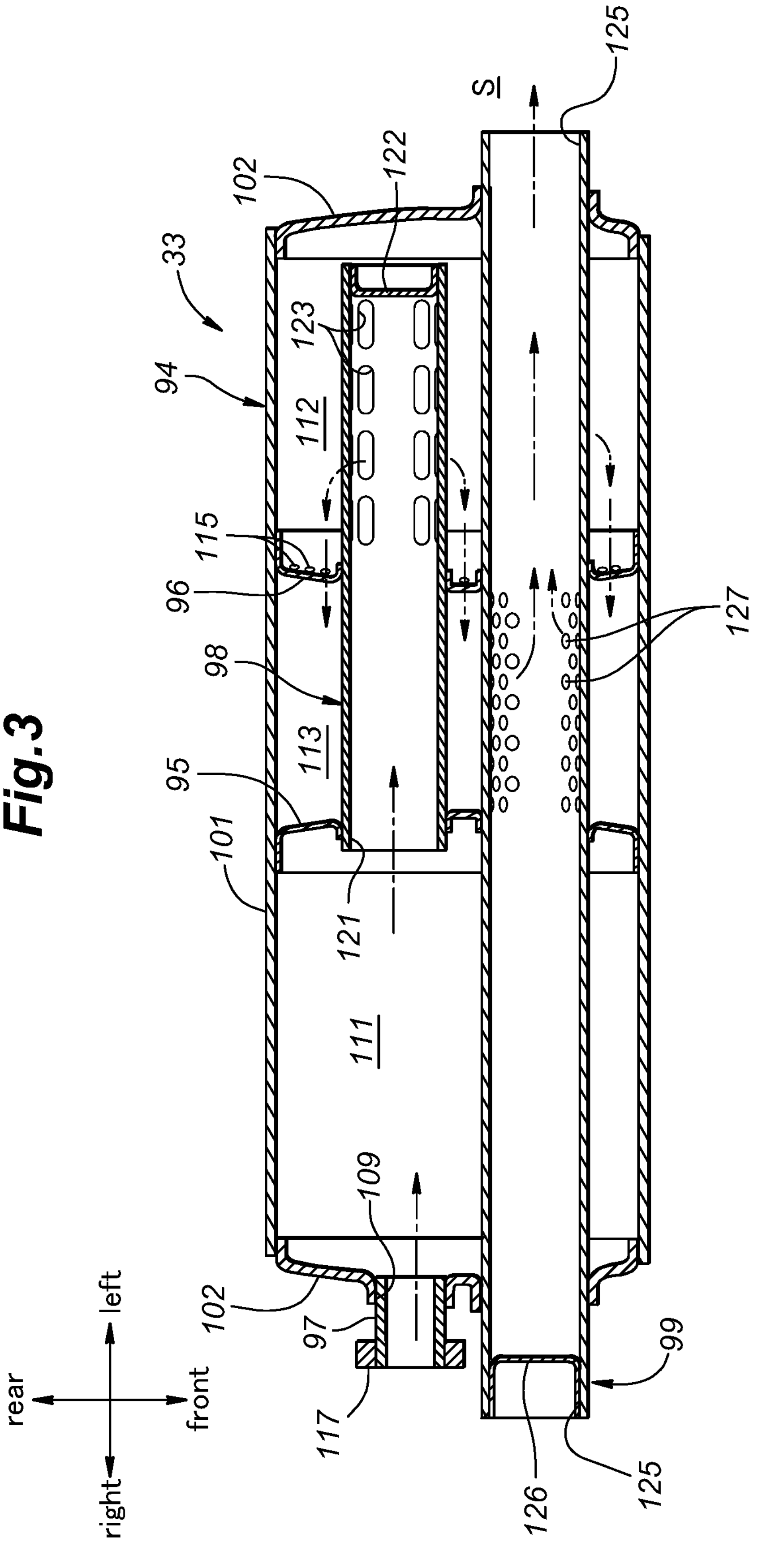
FIG. 3 is a cross-sectional view showing a muffler according to the embodiment of the present invention.

With reference to FIG. 3, the muffler body 94 has a cylindrical shape elongated in the lateral direction. That is, in the present embodiment, the longitudinal direction of the muffler body 94 is the lateral direction. In another embodiment, the muffler body 94 may have a shape (for example, a polygonal tubular shape) other than a cylindrical shape.

With reference to FIGS. 2 and 3, the muffler body 94 includes a tubular portion 101 extending in the lateral direction, and a pair of lid portions 102 covering openings at both ends of the tubular portion 101. An outer circumferential surface of the tubular portion 101 may be fixed to the crankcase 7 and/or the first and second cylinder banks 8, 9, or may be fixed to the main body of the work machine P.

With reference to FIG. 3, a plurality of muffling chambers 111 to 113 is formed inside the muffler body 94. The muffling chambers 111 to 113 include a first muffling chamber 111 formed at a right end of the muffler body 94, a second muffling chamber 112 formed at a left end of the muffler body 94, and a third muffling chamber 113 formed between the first muffling chamber 111 and the second muffling chamber 112. Volumes of the muffling chambers 111 to 113 become smaller in order of "a volume of the first muffling chamber 111, a volume of the second muffling chamber 112, and a volume of the third muffling chamber 113". That is, a formula "the volume of the first muffling chamber 111>the volume of the second muffling chamber 112>the volume of the third muffling chamber 113" is satisfied. An inflow port 109 of the exhaust gas is provided at a right end of the first muffling chamber 111. The inflow port 109 consists of a hole provided in the right lid portion 102.

The plurality of partition walls 95, 96 include a first partition wall 95 laterally partitioning the first muffling chamber 111 and the third muffling chamber 113, and a second partition wall 96 laterally partitioning the second muffling chamber 112 and the third muffling chamber 113. The second partition wall 96 is provided with multiple small holes 115 over the entire area thereof, and the second muffling chamber 112 and the third muffling chamber 113 communicate with each other via these multiple small holes 115.

With reference to FIGS. 2 and 3, the inflow pipe 97 is arranged on a right side (outside in the width direction of the engine body 3) of the muffler body 94. The inflow pipe 97 extends in the lateral direction. A connecting flange 117 is provided at a right end (upstream end) of the inflow pipe 97. The connecting flange 117 is fixed to the connecting flange 60 of the accommodating pipe 52 of the merging pipe 43 by a pair of bolts (not shown). A left end (downstream end) of the inflow pipe 97 is connected to the inflow port 109 of the first muffling chamber 111 of the muffler body 94.

As shown in FIG. 3, the communication pipe 98 extends in the lateral direction. The communication pipe 98 penetrates the first and second partition walls 95, 96 to be supported by the first and second partition walls 95, 96. At a right end (upstream end) of the communication pipe 98, a communication port 121 communicating with the first muffling chamber 111 is provided. To a left end (downstream end) of the communication pipe 98, a cap 122 is fixed by welding. Accordingly, the left end of the communication pipe 98 is covered with the cap 122. On an outer circumferential portion of the communication pipe 98, multiple communication holes 123 communicating with the second muffling chamber 112 are provided. According to the above configuration, the first muffling chamber 111 and the second muffling chamber 112 communicate with each other via the communication pipe 98.

The discharge pipe 99 extends in the lateral direction. The discharge pipe 99 penetrates the pair of lid portions 102 of the muffler body 94 and the first and second partition walls 95, 96 to be supported by the pair of lid portions 102 of the muffler body 94 and the first and second partition walls 95, 96. On an outer circumferential portion of the discharge pipe 99, multiple outer circumferential holes 127 communicating with the third muffling chamber 113 are provided. The left and right ends of the discharge pipe 99 protrude to both lateral sides of the muffler body 94. At left and right ends of the discharge pipe 99, a pair of openings 125 are formed. To the opening 125 formed at the right end of the discharge pipe 99, a lid member 126 is fixed by welding. Accordingly, the opening 125 formed at the right end of the discharge pipe 99 is closed by the lid member 126. The opening 125 formed at the left end of the discharge pipe 99 is not closed by a lid member 126, and communicates with an external space S on a left side of the muffler body 94. According to the above configuration, the third muffling chamber 113 and the external space S on the left side of the muffler body 94 communicate with each other via the discharge pipe 99. In another embodiment, the opening 125 formed at the left end of the discharge pipe 99 may be closed by the lid member 126, and the opening 125 formed at the right end of the discharge pipe 99 may be opened such that the third muffling chamber 113 and an external space on a right side of the muffler body 94 communicate with each other via the discharge pipe 99.

<Flow of the Exhaust Gas>

With reference to FIG. 2, when the engine 1 is driven, the exhaust gas is discharged from the exhaust ports 19 of the first and second cylinder banks 8, 9. The exhaust gas discharged from the exhaust ports 19 passes through the first and second exhaust pipes 41, 42. Thereafter, the exhaust gas passes through the inlet pipe 51 and the accommodating pipe 52 of the merging pipe 43 in this order, and then is discharged from the accommodating pipe 52 of the merging pipe 43. As described above, the exhaust gas passes through the accommodating pipe 52 of the merging pipe 43. Thus, the exhaust gas is purified by the catalyst 32 accommodated in the accommodating pipe 52 of the merging pipe 43.

As shown in FIG. 3, the exhaust gas discharged from the accommodating pipe 52 of the merging pipe 43 flows into the inflow pipe 97 of the muffler 33. The exhaust gas that has flowed into the inflow pipe 97 passes through the inflow pipe 97, and then flows into the first muffling chamber 111 of the muffler 33 via the inflow port 109. The exhaust gas that has flowed into the first muffling chamber 111 passes through the first muffling chamber 111, and then flows into the communication pipe 98 of the muffler 33 via the communication port 121. The exhaust gas that has flowed into the communication pipe 98 passes through the communication pipe 98, and then flows into the second muffling chamber 112 of the muffler 33 via the multiple communication holes 123. The exhaust gas that has flowed into the second muffling chamber 112 passes through the second muffling chamber 112, and then flows into the third muffling chamber 113 of the muffler 33 via the multiple small holes 115 of the second partition wall 96. The exhaust gas that has flowed into the third muffling chamber 113 passes through the third muffling chamber 113, and then flows into the discharge pipe 99 of the muffler 33 via the multiple outer circumferential holes 127. The exhaust gas that has flowed into the discharge pipe 99 passes through the discharge pipe 99, and is then discharged from the opening 125 formed at the left end of the discharge pipe 99 to the external space S on the left side of the muffler body 94. In this way, the exhaust gas passes through the muffler 33, and thus the exhaust sound is reduced.

<Effect>

In the present embodiment, the muffler 33 is detachably connected to the accommodating pipe 52 of the merging pipe 43 of the exhaust collecting pipe 31. By adopting such a configuration, the user can appropriately set the muffler 33 according to the configuration and the like of the work machine P in which the engine 1 is installed. Accordingly, the flexibility for setting the muffler 33 can be improved.

Further, the catalyst 32 extends in the front-and-rear direction from the front end side (base end side) of the first cylinder bank 8 to the rear end side (distal end side) of the first cylinder bank 8. By adopting such a configuration, the engine body 3 and the catalyst 32 are arranged compactly, so that the engine 1 can be made compact. Furthermore, the length of the catalyst 32 can be sufficiently secured, so that the performance to purify the exhaust gas can be improved.

Further, the catalyst 32 is accommodated in the merging pipe 43. By adopting such a configuration, the number of catalysts 32 can be reduced as compared with a case where the catalysts 32 are accommodated in each of the first and second exhaust pipes 41, 42. Accordingly, the configuration of the engine 1 can be simplified.

Further, the merging pipe 43 is composed of the inlet pipe 51 and the accommodating pipe 52. Accordingly, the length of the catalyst 32 can be sufficiently secured while the configuration of the merging pipe 43 is made as simple as possible. Further, the muffler 33 is connected to the accommodating pipe 52 of the merging pipe 43 on the rear end side (distal end side) of the first cylinder bank 8. Accordingly, it is possible to arrange the muffler 33 in either the lateral direction (the width direction of the engine body 3) or the front-and-rear direction (the height direction of the engine body 3) without protruding the muffler 33 greatly with respect to the engine body 3 (see FIGS. 2 and 4). Accordingly, the flexibility of setting of the muffler 33 can be improved.

Further, in the present embodiment, the muffler body 94 extends in the lateral direction from the rear end side (distal end side) of the first cylinder bank 8 to the rear end side (distal end side) of the second cylinder bank 9 (see FIG. 2). According to this arrangement, the muffler body 94 is arranged perpendicularly to the catalyst 32. Accordingly, it is possible to sufficiently secure the length of the muffler body 94 without protruding the muffler body 94 greatly with respect to the engine body 3. Accordingly, the volume of the muffler body 94 is increased, so that the muffling performance can be enhanced.

Figure 4:
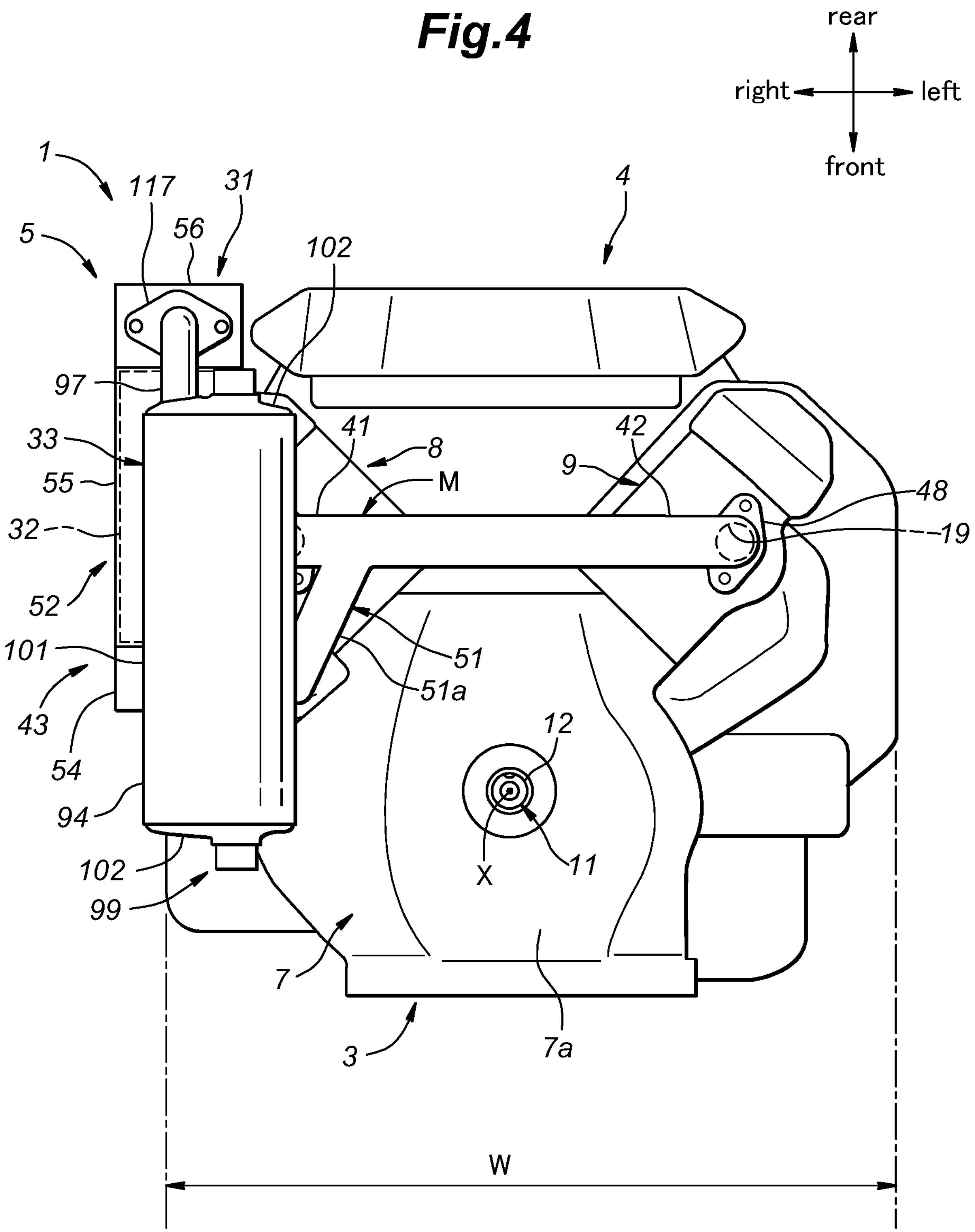
FIG. 4 is a bottom view showing a V-type engine according to another embodiment of the present invention.

In another embodiment, the muffler body 94 may extend in the front-and-rear direction (height direction of the engine body 3) from the rear end side (distal end side) of the first cylinder bank 8 to the front end side (base end side) of the first cylinder bank 8 (see FIG. 4). According to this arrangement, the muffler body 94 is arranged parallel to the catalyst 32. Accordingly, like the present embodiment, it is possible to sufficiently secure the length of the muffler body 94 without protruding the muffler body 94 greatly with respect to the engine body 3. Accordingly, the volume of the muffler body 94 is increased, so that the muffling performance can be enhanced.

Further, in the present embodiment, the air cleaner 4 has a canister-like shape, and is arranged on the opposite side of the catalyst 32 with the first and second cylinder banks 8, 9 in between when viewed in the lateral direction. According to this arrangement, the air cleaner 4 is arranged sufficiently away from the catalyst 32. Accordingly, it is possible to prevent the temperature around the air cleaner 4 from rising according to the heat generation of the catalyst 32. Accordingly, the intake air temperature of the engine 1 can be lowered, so that the output of the engine 1 can be improved.

Further, in another embodiment, the air cleaner 4 may have a flat plate-like shape, and may be arranged between the first and second cylinder banks 8, 9 (see FIG. 4). According to this arrangement, it is possible to arrange the air cleaner 4 by effectively utilizing the space between the first and second cylinder banks 8, 9. Accordingly, the engine 1 can be made more compact.

Further, the catalyst 32 is arranged higher than the lower surface 7*a* of the crankcase 7. By adopting such a configuration, it is possible to prevent the catalyst 32 from protruding lower than the lower surface 7*a* of the crankcase 7 in the vertical type engine 1. Accordingly, the interference between the catalyst 32 and the engine mount 14 can be suppressed.

As described above, by adopting the above-mentioned arrangement of the catalyst 32, the air cleaner 4 having a canister-like shape can be arranged away from the first and second cylinder banks 8, 9 or the air cleaner 4 having a flat plat-like shape can be arranged between the first and second cylinder banks 8,9 without protruding the catalyst 32 lower than the lower surface 7*a* of the crankcase 7. Accordingly, the compatibility of the air cleaner 4 is enhanced and the flexibility of setting of the air cleaner 4 can be improved.

Further, the catalyst 32 is arranged more rightward (outward in the width direction of the engine body 3) than the exhaust port 19 of the first cylinder bank 8. By adopting such a configuration, the interference between the first exhaust pipe 41 connected to the exhaust port 19 of the first cylinder bank 8 and the accommodating pipe 52 accommodating the catalyst 32 can be suppressed.

Concrete embodiments of the present invention have been described in the foregoing, but the present invention should not be limited by the foregoing embodiments and various modifications and alterations are possible. That is, the positions, orientations, or the like of the components of the exhaust device 5 can be freely changed according to the configuration of the work machine P (for example, a generator, a welder, a lawn mower, a cultivator, or the like) on which the engine 1 is mounted. Accordingly, the position and exhaust direction of the muffler 33 are also not limited by the foregoing embodiments, and can be freely set within the scope of the present invention. For example, when the work machine P provided with the engine 1 is used in an orchard, the position and exhaust direction of the muffler 33 may be set such that the exhaust gas discharged from the muffler 33 does not hit against the fruit trees.

Glossary of Terms

1: a V-type engine
3: an engine body
4: an air cleaner
7: a crankcase
7*a*: a lower surface of the crankcase
8: a first cylinder bank
9: a second cylinder bank
11: a crankshaft
12: a PTO shaft (an example of an output portion)
19: exhaust port
31: an exhaust collecting pipe
32: a catalyst
33: a muffler
41: a first exhaust pipe
42: a second exhaust pipe
43: a merging pipe
51: an inlet pipe
52: an accommodating pipe
94: a muffler body
111: a first muffling chamber
112: a second muffling chamber
113: a third muffling chamber
M: a merging portion
P: a work machine

What is claimed is:

1. A V-type engine, comprising:
an engine body including
a crankcase configured to rotatably support a crankshaft, and
first and second cylinder banks extending from the crankcase;
an exhaust collecting pipe connected to the first and second cylinder banks;
a catalyst accommodated in the exhaust collecting pipe; and
a muffler detachably connected to the exhaust collecting pipe,
wherein the catalyst extends in a height direction of the engine body from a base end side of the first cylinder bank to a distal end side of the first cylinder bank, the base end side of the first cylinder bank being one end side of the first cylinder bank in the height direction of the engine body, the distal end side of the first cylinder bank being another end side of the first cylinder bank in the height direction of the engine body,
wherein the exhaust collecting pipe includes:
a first exhaust pipe connected to the first cylinder bank;
a second exhaust pipe connected to the second cylinder bank; and
a merging pipe connected to a merging portion of the first and second exhaust pipes, and
wherein the merging pipe includes:
an inlet pipe connected to the merging portion of the first and second exhaust pipes; and
an accommodating pipe connected to the inlet pipe on the base end side of the first cylinder bank and extending in the height direction of the engine body from the base end side of the first cylinder bank to the distal end side of the first cylinder bank,
the catalyst is accommodated in the accommodating pipe, and
the muffler is detachably connected to the accommodating pipe on the distal end side of the first cylinder bank.

2. A V-type engine, comprising:
an engine body including
a crankcase configured to rotatably support a crankshaft, and
first and second cylinder banks extending from the crankcase;
an exhaust collecting pipe connected to the first and second cylinder banks;
a catalyst accommodated in the exhaust collecting pipe;
a muffler detachably connected to the exhaust collecting pipe; and
an air cleaner connected to the first and second cylinder banks,
wherein the catalyst extends in a height direction of the engine body from a base end side of the first cylinder bank to a distal end side of the first cylinder bank,
wherein the air cleaner has a canister-like shape, and is arranged on an opposite side of the catalyst with the first and second cylinder banks in between when viewed in a width direction of the engine body.

3. The V-type engine according to claim 1, further comprising an air cleaner connected to the first and second cylinder banks,
wherein the air cleaner has a flat plate-like shape, and is arranged between the first and second cylinder banks.

4. A V-type engine, comprising:
an engine body including
a crankcase configured to rotatably support a crankshaft, and
first and second cylinder banks extending from the crankcase;
an exhaust collecting pipe connected to the first and second cylinder banks;
a catalyst accommodated in the exhaust collecting pipe; and
a muffler detachably connected to the exhaust collecting pipe,
wherein the catalyst extends in a height direction of the engine body from a base end side of the first cylinder bank to a distal end side of the first cylinder bank,
wherein an output portion of the crankshaft protrudes from a lower surface of the crankcase, and
the catalyst is arranged higher than the lower surface of the crankcase.

5. The V-type engine according to claim 1, wherein each of the first and second cylinder banks is provided with an exhaust port, and
the catalyst is arranged more outward than the exhaust port of the first cylinder bank with respect to a width direction of the engine body.

6. A work machine comprising the V-type engine according to claim 1.

7. The V-type engine according to claim 1, wherein the muffler includes a muffler body having a muffling chamber, and
the muffler body extends in a width direction of the engine body from the distal end side of the first cylinder bank to a distal end side of the second cylinder bank.

8. The V-type engine according to claim 1, wherein the muffler includes a muffler body having a muffling chamber, and
the muffler body extends in the height direction of the engine body from the distal end side of the first cylinder bank to the base end side of the first cylinder bank.

* * * * *